(12) United States Patent
Leonida

(10) Patent No.: US 7,217,472 B2
(45) Date of Patent: May 15, 2007

(54) ELECTROLYTE SUPPORT MEMBER FOR HIGH DIFFERENTIAL PRESSURE ELECTROCHEMICAL CELL

(75) Inventor: Andrei Leonida, West Hartford, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 462 days.

(21) Appl. No.: 10/739,650

(22) Filed: Dec. 18, 2003

(65) Prior Publication Data

US 2005/0133364 A1 Jun. 23, 2005

(51) Int. Cl.
*H01M 2/14* (2006.01)

(52) U.S. Cl. .............. 429/38; 429/34; 429/39; 429/44; 204/279; 204/283; 204/284; 29/557; 29/558; 264/469; 264/470; 264/482

(58) Field of Classification Search ............ 429/34, 429/38, 39, 40, 44; 204/279, 283, 284, 252, 204/263; 29/557, 558; 264/469, 470, 482
See application file for complete search history.

(56) References Cited

U.S. PATENT DOCUMENTS

| 4,743,350 | A | 5/1988 | Cawlfield et al. |
|---|---|---|---|
| 4,770,756 | A | 9/1988 | Cawlfield et al. |
| 5,296,109 | A | 3/1994 | Carlson et al. |
| 5,316,644 | A | 5/1994 | Titterington et al. |
| 5,338,412 | A | 8/1994 | Burk et al. |
| 5,350,496 | A | 9/1994 | Smith et al. |
| 5,356,728 | A | 10/1994 | Balachandran et al. |
| 5,372,689 | A | 12/1994 | Carlson et al. |
| 5,770,326 | A | 6/1998 | Limaye |
| 6,007,933 | A | 12/1999 | Jones |
| 6,024,848 | A | 2/2000 | Dufner et al. |
| 6,171,719 | B1 * | 1/2001 | Roy et al. ............. 429/39 |
| 6,270,636 | B1 | 8/2001 | Byron, Jr. et al. |
| 6,524,454 | B2 | 2/2003 | Byron, Jr. et al. |
| 2001/0004050 | A1 * | 6/2001 | Byron et al. ............. 204/279 |

* cited by examiner

*Primary Examiner*—Bruce F. Bell
(74) *Attorney, Agent, or Firm*—Carlson, Gaskey & Olds

(57) ABSTRACT

A support member is useful for supporting membranes such as solid polymer electrolyte ion exchange membranes such as those used in electrochemical cell applications. The support member has a first lattice pattern on a first side of a single piece of material. A second lattice pattern on a second side of the single piece of material cooperates with the first lattice pattern to establish a plurality of flow passages across the material. Each lattice pattern has a corresponding plurality of recesses that extend partway through the material and overlapping portions of the recesses define the flow passages. In a disclosed example, the monolithic support member lattice patterns are established using chemical etching.

20 Claims, 1 Drawing Sheet

ELECTROLYTE SUPPORT MEMBER FOR HIGH DIFFERENTIAL PRESSURE ELECTROCHEMICAL CELL

FIELD OF THE INVENTION

This invention generally relates to supporting ion exchange membranes such as those used in proton exchange membrane hydrogen generators by water electrolysis and fuel cell technology. More particularly, this invention relates to a single piece support member for such applications, for example.

DESCRIPTION OF THE RELATED ART

There are various situations, such as generating hydrogen gas from water for use in fuel cells for electrical energy, where performing high pressure electrochemical processes is advantageous if the products are meant for storage or are used at elevated pressure. Solid polymer electrolyte technology is a suitable option for high-pressure applications because the electrolyte is a flexible solid and has a higher differential pressure capability than the bubble pressure of the typical electrolyte matrix structure used to contain liquid electrolyte. High-pressure hardware further enables elevated pressure to be used on both sides of the cell or only on the fluid-side of the system where it is required for storage, while the balance of the system remains at essentially ambient pressure.

In solid polymer electrolyte cell technology, the ion exchange electrolyte membrane is also the sealing material and the only separator between the anode and cathode cavities of the cell assembly. The electrodes are typically applied directly to the polymer sheet and the electrical contact is established through a permeable member to allow, as much as possible, unobstructed material exchange between electrodes and the fluid cavities. The fluid cavities are designed in a known manner to contain the pressure and keep the fluids separated as required for the cell operation. The hardware of a typical high-pressure cell is made mostly of metal. The electrolyte membrane is typically the weakest component in the cell assembly.

Typical membrane materials are not altered or substituted to match strength to the stress expected in the application. Instead, the support for the electrolyte membrane is typically tailored to provide adequate reinforcement against a differential loading expected for a particular application. Additionally, providing adequate membrane support is complicated because the membrane material typically creeps even at lower stress levels. The membrane is inherently weaker than the other materials in the assembly so support is necessary and sizing for creep renders the design task even more difficult. Creep is known to be a time-dependent phenomenon, which is not under a designer's control. In most situations, the membrane will deform to the point of failure and the only question seems to be how long it will take until failure occurs. It follows that a supported membrane, which appears to perform adequately in a testing situation, may still fail after a longer duration or if the assembly were put into full service. The support has to provide the strength as well as to limit the movement due to creep without hindering the fluid interchange or add unreasonable weight or expense to the assembly.

Previous attempts to increase the hardware differential pressure capability by providing adequate support to the membrane include using sintered porous metal plates. Examples are shown in U.S. Pat. Nos. 5,296,109; 5,350,496; 5,372,689 and 6,024,848. Such porous plates perform adequately, however, unless specifically stated, they are included in the design to improve electrical performance rather than differential pressure capability and are expensive and not well suited for applications where weight or volume considerations are important.

Additionally, previous attempts to produce an adequate membrane support for high differential pressure applications (i.e., those where the pressure differential exceeds approximately 2,069 kPa (300 PSI), for example) using fine mesh expanded metal screens resulted in poor cell performance mainly because the alignment error approached the opening size. In those arrangements, a positional shift in the metal screens making up the support structure limited material interchange across the support between the fluid cavity and the electrode.

Where a plurality of screens are set on top of each other to form a membrane support, individual strands within the layers are free to move relative to each other and the adjacent layers. Alignment and pressure-caused movement in the screen layers alters the screens geometry and the support characteristics. Therefore, there is no material strength or electrical performance benefit from the combined cross-section of discrete layers.

There is a need for a support structure that is capable of withstanding the forces associated with the pressure differentials within such an arrangement, that allows adequate exchange (i.e., flow) and resists creep to avoid deformation of the membrane to the point of failure. This invention addresses that need while avoiding the shortcomings and drawbacks described above.

SUMMARY OF THE INVENTION

In general terms, this invention is a single-piece membrane support member. One application for an example embodiment is for a high pressure electrochemical cell having a built-in limit for the membrane movement due to material creep when operating under stress at elevated temperature, pressure or both.

In one example, a support member comprises a monolithic body having a first side with a plurality of first recesses arranged in a first pattern. A second side has a plurality of second recesses arranged in a second pattern. The first and second patterns are arranged relative to each other such that a plurality of flow passages across the body are defined by overlapping portions of the first and second recesses.

The single-piece structure maintains the recesses in a fixed relationship, which ensures adequate flow and provides enhanced strength superior to the multi-layered arrangements.

Another example of an ion exchange membrane support member includes a single piece of material having a first lattice pattern on a first side and a second lattice pattern on a second side. The first and second lattice patterns are asymmetric and together establish a plurality of flow passages through the piece of material.

One example method of making an exchange membrane support member includes forming a first lattice pattern on a first side of a single piece of material. Forming a second lattice pattern that is asymmetric relative to the first lattice pattern on a second side of the piece of material provides flow passages through the material.

In one example, the first and second sides are simultaneously etched to establish the respective lattice patterns and the flow passages.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENTS

Figure 1:
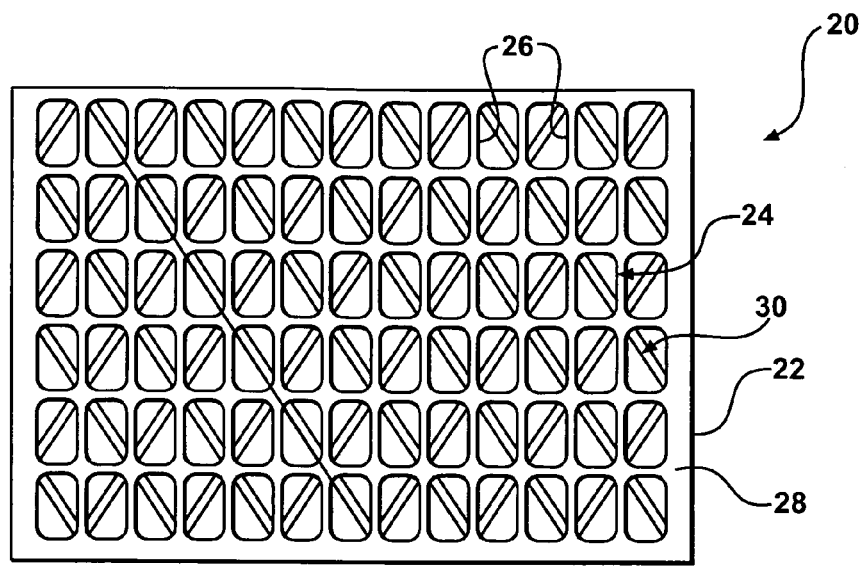
FIG. 1 schematically illustrates a membrane support member designed according to one embodiment of this invention.

FIG. 1 schematically shows a membrane support member 20. A single piece of material 22 has a first lattice pattern 24 with a plurality of recesses 26 on a first side 28 of the material.

Figure 2:
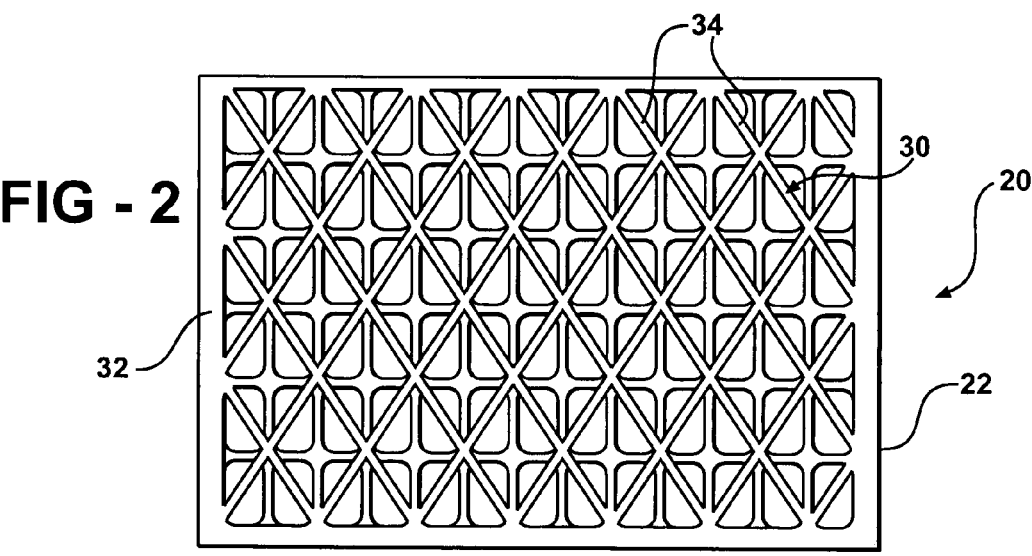
FIG. 2 schematically illustrates an opposite side of the embodiment of FIG. 1.

As best seen in FIG. 2, a second lattice pattern 30 on a second side 32 of the single piece of material includes a plurality of recesses 34. As can be appreciated from FIGS. 1 and 2, the lattice patterns 24 and 30 are asymmetric relative to each other. In this example, the lattice pattern 24 includes a plurality of generally rectangular recesses 26. The lattice pattern 30 in this example includes a plurality of generally diamond-shaped recesses 34.

Although specific lattice patterns are shown, a variety of patterns may be used to meet the needs of a particular situation. Those skilled in the art who have the benefit of this description will be able to select appropriate geometries of the recesses and lattice patterns to meet the needs of their particular situation.

Although only two lattice patterns are shown in the embodiments of FIGS. 1 and 2, it is possible to employ more than two lattice patterns within a support member designed according to this invention.

The recesses on each side of the sheet of material 22 each have a depth that is less than the overall thickness of the piece of material 22. In one example, each set of recesses has a depth that corresponds to approximately one-half of the thickness of material. In another example, one set of recesses has a depth that is greater than the other set of recesses. Overlapping portions of the recesses 26 and the recesses 34 establish flow passages through the material 22. Because the combined depths of the recesses equals the thickness of the material in this example, overlapping portions of the recesses provide openings through the material, which serve as the flow passages.

The example flow passages allow fluid flow perpendicular to the plane of the support member 20 and within the plane of the support member 20. The single-piece construction ensures that the alignment of recesses remains fixed and the flow passages do not become blocked as may otherwise occur if discrete sheets of support mesh were used.

The single piece of material 22 having first and second lattice patterns 24 and 30 provides a stronger structure than previous two-layer assemblies because the two lattice patterns are part of the same sheet of material. The composite stiffness is increased compared to distinct layer assemblies. The attached nature of the lattices, which is a feature of the single-piece structure, allows one lattice to support the other and to resist deformations.

One example support member designed according to the embodiments of FIGS. 1 and 2 is able to withstand pressures on the order of approximately 5,517 kPa (800 PSI) without any corresponding membrane failure.

Another advantage of the disclosed embodiment is that the monolithic support member has a continuous transition between the active and seal areas of the cell assembly hardware. The single-piece design greatly reduces or eliminates any differential movement that occurred when a prior art sintered porous metal plate was used for membrane support because the prior art approach creates a discontinuity in the metal foil between the active and seal areas of the cell hardware. Such a discontinuity creates two areas of differential movement or compressive stiffness in the hardware because the compressive force required on the seal is different from that in the active area. With the example embodiment of FIGS. 1 and 2, although the forces are still different, the differential movement is greatly reduced or eliminated. This feature is advantageous to protect the electrolyte membrane from hardware-induced stresses and premature cell failure.

Figure 3:
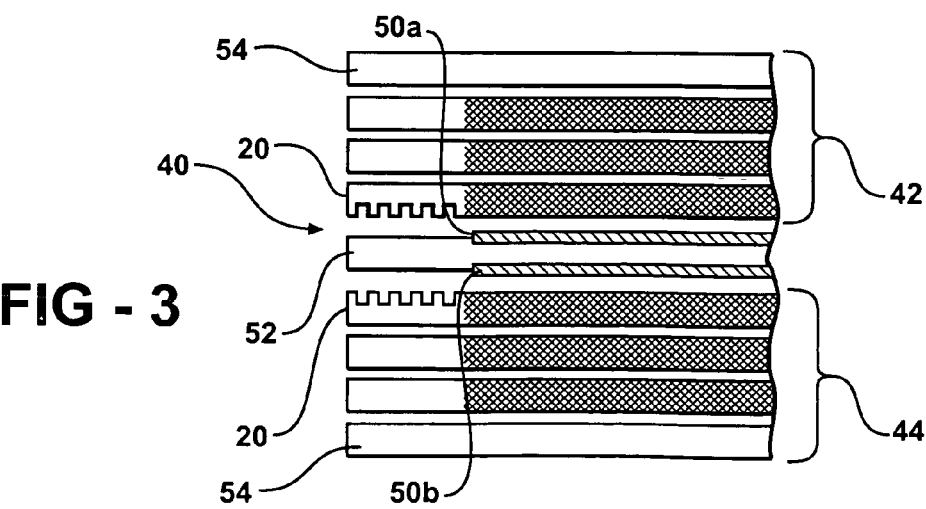
FIG. 3 schematically, partially illustrates an example electrochemical cell assembly in a partially exploded view, incorporating a support member such as that shown in FIGS. 1 and 2.

FIG. 3 schematically shows a solid polymer electrolyte electrochemical cell assembly 40 having known fluid cavities 42 and 44. The assembly includes an example support member 20 designed according to an embodiment of this invention. The support members 20 are positioned on opposite sides of electrodes 50a and 50b and the electrolyte membrane 52. Conventional terminating separators 54 establish the outside of the fluid cavities 42 and 44, which serve as the anode and cathode of a fuel cell assembly in one example. The components used to make such a cell assembly are known and utilizing an ion exchange membrane support member 20 designed according to this invention provides several advantages.

Depending on the application for the support member, a variety of materials may be used to form the support member. In one example, injection molding forms the support member having the first and second lattice patterns on opposite sides of the single piece of material. In another example, a casting technique is used to form the support member. In still another example, conventional etching techniques are used to establish the lattice patterns on the sides of the single piece of material 22.

One example includes using a print image on a transparent substrate darkened with the areas to be etched. A metal foil is then coated with a modified rubber film according to the transparent substrate. Photo tools are then aligned on both sides of the piece of material and exposed to light. The rubber film is cured and the portions coated with the rubber film are protected from etching. The foil material is then put into a conventional etching process where it is heated and jets of etchends are applied to each side of the material. The speed with which the material moves through the processing machinery and the amount of spray applied controls the depth of the recesses formed on the respective sides. After enough material has been etched to establish the recesses of a desired depth, an alkaline solution removes the cured rubber film and the resulting support member can be handled in a conventional manner and used in the desired application.

In one example, an etched support member designed according to this invention provides significant cost savings compared to sintered porous metal plates of comparable size. In one example, the cost savings were on the order of 50%. A variety of materials may be required for electrochemical hardware and material selection is important for device performance and useful life. Using an etched support member designed according to this invention allows for manufacturing the support member from a wide variety of materials. A support member designed according to an embodiment of this invention may be used for a variety of applications that require high operating pressure and which would benefit from having high differential pressure capability built into the hardware. Example applications extend beyond fuel cell technology and include electrochemical compressors and separators, electrochemical reactors for hydrogen peroxide production and similar applications. Those skilled in the art who have the benefit of this description will realize what situations with which they are presented will benefit from using a support member designed according to this invention.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A membrane support member, comprising:
   a monolithic body having a first side with a plurality of first recesses arranged in a first pattern and a second side with a plurality of second recesses arranged in a second different pattern, the first and second patterns being arranged relative to each other such that a plurality of flow passages across the body are defined by overlapping portions of the first and second recesses.

2. The support member of claim 1, wherein the flow passages are smaller than the first or the second recesses.

3. The support member of claim 1, wherein the first pattern defines a first geometry of the first recesses and the second pattern defines a second geometry of the second recesses.

4. The support member of claim 3, wherein the first and second geometries are different.

5. The support member of claim 3, wherein the flow passages have a third geometry.

6. The support member of claim 1, wherein the body has a thickness, the first recesses have a first depth, the second recesses have a second depth and the first and second depths together are approximately equal to the thickness.

7. The support member of claim 1, wherein the first and second patterns are asymmetric with respect to each other.

8. A method of making an exchange membrane support member, comprising:
   forming a first lattice pattern on a first side of a single piece of material; and
   forming a second lattice pattern that is asymmetric relative to the first lattice pattern on a second side of the single piece of material to provide flow passages through the material.

9. The method of claim 8, including etching the patterns.

10. The method of claim 8, including forming the patterns during one of a molding or a casting process.

11. The method of claim 8, including forming a plurality of first recesses in a first side of the material and a plurality of second recesses arranged in a second side of the material and arranging the first and second patterns relative to each other such that the plurality of flow passages are defined by overlapping portions of the first and second recesses.

12. The method of claim 11, including forming the first recesses with a first geometry and the second recesses with a second geometry.

13. The method of claim 12, wherein the first and second geometries are different.

14. The method of claim 11, including providing the first recesses with a first depth, the second recesses with a second depth and selecting the first and second depths such that the first and second depths together are approximately equal to a thickness of the material.

15. A membrane support member, comprising:
   a single piece of material having a first lattice pattern on a first side and a second lattice pattern on a second side, the first and second lattice patterns being asymmetric and together establishing a plurality of flow passages through the piece of material.

16. The member of claim 15, wherein the first lattice pattern defines a plurality of first recesses, the second lattice pattern defines a plurality of second recesses and the plurality of flow passages are defined by overlapping portions of the first and second recesses.

17. The member of claim 16, wherein the flow passages are smaller than the first or the second recesses.

18. The member of claim 15, wherein the first lattice pattern has a first geometry and the second lattice pattern has a second geometry.

19. The member of claim 18, wherein the first and second geometries are different.

20. The member of claim 18, wherein the flow passages have a third geometry.

* * * * *